Aug. 1, 1944.  E. EGER  2,354,912
SAFETY INNER TUBE
Original Filed April 22, 1939   2 Sheets-Sheet 1
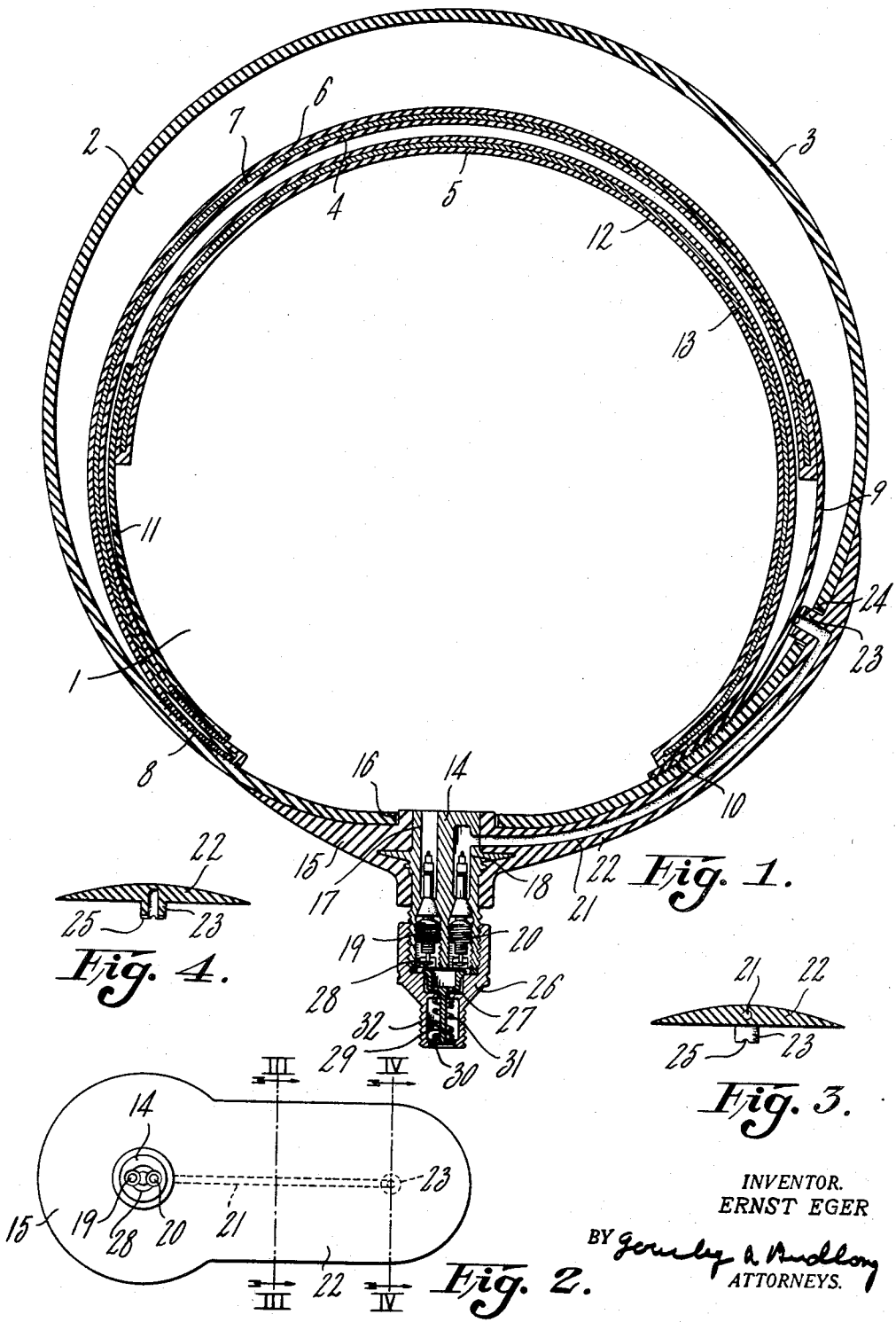
INVENTOR.
ERNST EGER
BY
ATTORNEYS.

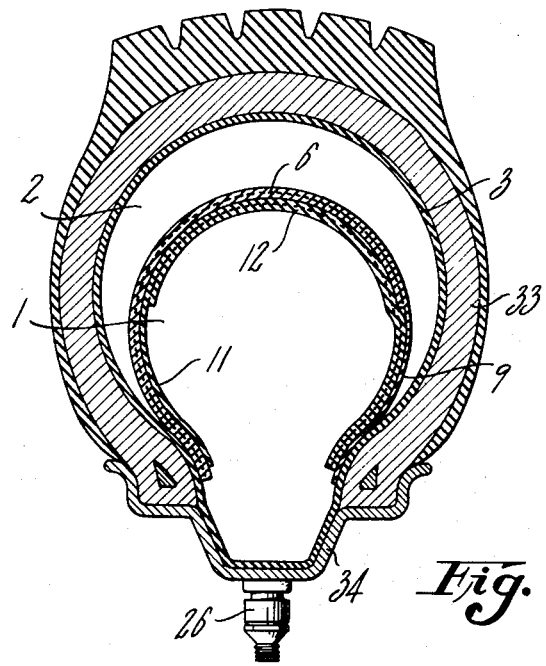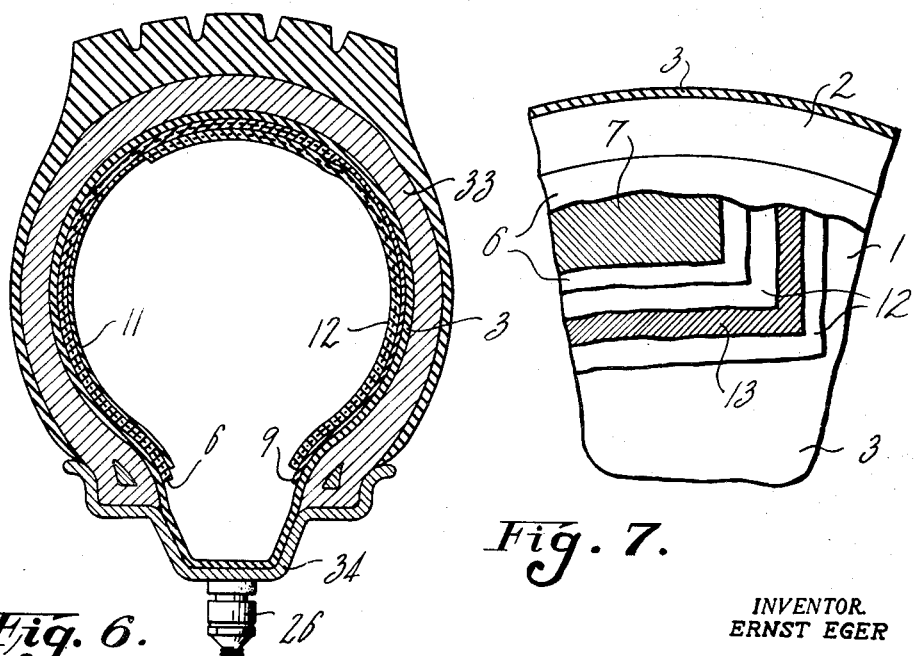

Patented Aug. 1, 1944

2,354,912

UNITED STATES PATENT OFFICE 2,354,912

SAFETY INNER TUBE

Ernst Eger, Grosse Pointe Park, Mich., assignor to United States Rubber Company, New York, N. Y., a corporation of New Jersey Original application April 22, 1939, Serial No. 269,443. Divided and this application August 29, 1940, Serial No. 354,670

4 Claims. (Cl. 152—342)

This invention is a division of my co-pending application Serial No. 269,443 filed April 22, 1939, and relates to inner tubes for pneumatic tires, and in particular it relates to a multiple chamber inner tube which functions to retain a load supporting inflation pressure, notwithstanding deflation of one of the inner tube chambers.

In carrying out my invention I provide a safety inner tube for a pneumatic tire comprising an outer endless tubular wall, a separating partition formed therein for dividing the inner tube into two separate chambers, and a valve mechanism for inflating these chambers. Individual valves are provided in the valve mechanism so that each chamber may be inflated at one time and so that either or both chambers may be deflated when desired.

The separating partition within the inner tube is formed as a composite structure of rubber and fabric composition comprising an inner wall and an outer wall. Each of these walls comprises a fabric reinforced strip and an elastic or resilient strip joined together along their adjacent edges. The opposite free edges of each wall are in turn circumferentially vulcanized to the wall of the inner tube at opposite sides of the rim region of the tube. The inner and outer walls of the partition are relatively arranged in the inner tube in opposed relation so that the reinforced strip of one wall is adjacent to and overlies the elastic or resilient strip of the other wall at an edge of each. This arrangement of the inner and outer walls is such that the reinforced strips materially overlap each other and upon expansion of the inner chamber, resulting from deflation of the outer chamber, the reinforced strips slide relatively in opposite directions to an extended overlapping position adjacent the crown portion of the inner tube and form a reinforced double wall section at this region of the tube.

The reinforced rubber composition, of which the reinforced strips of the inner and outer walls are formed, may be of weftless cord fabric or may be a weftless cord fabric embedded in a sheet of rubber composition. The weftless cord fabric has its individual strands running in parallel relation and at a substantial angle relative to the longitudinal plane of the inner tube. In practice it has been found satisfactory to make this angle approximately 45°. These strips are so arranged in relation to each other in the inner tube that their respective cords extend at a substantial angle to each other, generally at approximately right angles to each other, so that a reinforced construction is formed in the partition which aids in bridging any gap that might occur at the crown portion of the tire or resisting any puncturing medium that might penetrate same.

The accompanying drawings illustrate a present preferred embodiment of the invention, in which:

Fig. 1 is a transverse view, in section, of an inner tube embodying features of my invention;

Fig. 2 is a plan view of a valve base;

Fig. 3 is a transverse view, in section, of the valve base, taken along line III—III of Fig. 2;

Fig. 4 is a transverse view, in section, of the valve base, taken along line IV—IV of Fig. 2;

Fig. 5 is a transverse view, in section, of an inflated inner tube, illustrated in assembly with a tire casing and rim;

Fig. 6 is a view similar to Fig. 5, illustrating the position of the inner tube upon deflation of the outer chamber; and Fig. 7 is a broken view illustrating the ply arrangement of the inner tube.

Referring to the drawings, and in particular to Fig. 1, I show a preferred embodiment of my invention in the form of a multiple chamber inner tube having an inner chamber 1 and an outer chamber 2. These chambers 1 and 2 are enclosed within a tubular wall 3 of rubber composition formed as an endless, annular member. The chambers 1 and 2 are separated by a double wall construction or partition comprising an outer wall 4 and an inner wall 5.

The outer wall 4 is composed, in part, of a strip of rubber composition 6 having a weftless cord fabric reinforcement 7 embedded therein. The individual strands of the reinforcement 7 are diagonally positioned at approximately 45° to the longitudinal plane of the tube so as to allow for a slight expansion of the strip 6 in its longitudinal direction. One marginal portion of the strip 6 is circumferentially secured by vulcanization to the tubular wall 3 at a point indicated by the numeral 8 which lies near the rim portion of the wall 3. The opposite marginal portion of the strip 6 is vulcanized to an elastic or resilient strip of rubber composition 9 and the marginal portion of the strip 9 is in turn circumferentially vulcanized to the wall 3 at a point 10 which is substantially symmetrically located relative to the point 8; the region between these points representing a rim engaging portion of the wall 3. The strip 6 and the strip 9 combine to provide a complete outer enclosure for the chamber 1.

In a similar but reversed manner, the inner wall 5, comprises an elastic or resilient strip of rubber composition 11 and a strip of rubber composition 12 having a weftless cord fabric reinforcement 13 embedded therein. The strip 12 is vulcanized to the strip 9 near the point 10 adjacent the rim portion of the tube. The strip 11 is vulcanized to the free edge of the strip 12 and has its marginal edge, in turn, vulcanized to the marginal portion of the strip 6 near the point 8 adjacent the opposite side of the rim portion of the tube.

The individual strands of the reinforcement 13 also extend at approximately 45° relative to the longitudinal plane of the tube but are positioned in a direction substantially at right angles to the strands of the reinforcement 7 so that a double wall construction is formed by the strips 6 and 12 to bridge any gap or resist any puncturing medium that might occur in or penetrate the crown portion of a tire associated therewith and thereby materially reduce the possibility of occurrence of blowouts and tire failures.

The cross sectional, arcuate lengths of the reinforced strips 6 and 12 of the outer and inner walls 4 and 5 are such that, upon deflation of the chamber 2 and expansion of the air of the chamber 1, the strips 6 and 12 will form an overlapped protection extending over the crown portion of the inner tube. In this manner, the greater degree of protection is provided for that portion of the inner tube which lies adjacent to the road contacting surface of a tire.

In order to inflate the inner tube, I provide a valve mechanism which functions to permit the flow of air to enter simultaneously into both chambers 1 and 2, while at the same time retaining the air in those respective chambers by independent means. The valve mechanism comprises a valve body 14 bonded to a rubber composition base 15 which, in turn, is vulcanized to the wall 3 of the inner tube. An opening 16 extending through the wall 3 permits the valve body to communicate with the chamber 1. The valve body 14 is provided with apertures 17 and 18, each of which is provided with threads and seats for accommodating conventional valve cores 19 and 20, respectively. The aperture 17 communicates directly with chamber 1. The aperture 18 communicates with a passageway 21 formed in an extension 22 of the base 15. The aperture 21 continues through the extension 22 and through a lateral projection 23 forming a part of the extension 22 leading to the chamber 2. The projection 23 extends through and slightly beyond an aperture 24 in the wall 3, and includes grooves 25 to maintain an open passageway for air to the chamber 2 at all times and to prevent the wall 9 adjacent the projection 23 from sealing the aperture 21.

The base 15 and extension member 22 are vulcanized to the wall 3 at its outer surface, and thus provide by the passageway 21 a communicating aperture between the valve mechanism and the chamber 2, without interfering with the function or structure of the multiple chamber tube assembly. As shown in Figs. 3 and 4, the extension 22 is a long, tapered section which does not materially break up the uniform continuity of the outer surface of the inner tube.

In order to inflate and deflate the valve mechanisms 19 and 20 simultaneously, I provide an adapter 26 which, by threaded engagement, is secured to the valve body 14. Within the adapter 26 is a cup shaped member 27 for engaging the pins of the valve mechanisms 19 and 20. A recess 28 formed in the body member 14 permits axial movement of the cup member 27 for actuating the valve mechanisms 19 and 20. A plunger 29, extending from the cup shaped member 27 and including a head 30, permits accessible means for mechanically actuating the pins of the valve mechanisms 19 and 20. A spring 31 normally maintains the cup member 27 out of engagement with the valve mechanisms 19 and 20 and maintains the head 30 in closed position, thereby excluding dirt from the inside of the valve assembly. The adapter 26 is provided with external threads 32 for reception of a conventional dust cap or inflating hose adapter.

In the structure described herein it is obvious that fluid pressure may be introduced simultaneously into chambers 1 and 2, or, upon mechanical pressure against the pin head 30 the chambers 1 and 2 may be simultaneously deflated. The relation between the adapter 26 and the valve body 14 permits the adapter to be readily removed from the valve body, thereby giving access to the valve mechanisms 19 and 20.

In Fig. 5 I show the multiple inner tube of my invention properly inflated and assembled with a pneumatic tire casing 33 and rim 34. Because of the resilient nature of the walls of the inner tube, the outer wall 3 expands in a manner to fit tightly against the wall of the tire casing 33 and rim 34, while the walls 4 and 5 separating the chambers 1 and 2 adjust themselves to the position shown in Fig. 5. Because the valve mechanisms 19 and 20 are open to the same source of fluid supply during the inflation period, the pressures within the chambers 1 and 2 will be substantially equalized, while the stretching in the rubber composition walls between the chambers will overcome slight variations.

In the event of puncture or failure of the tire casing, resulting in rupture of the outer wall 3 of the inner tube, the pressure within the chamber 2 becomes relieved while the pressure within the chamber 1 causes the elastic strips 9 and 11 to stretch, thus allowing the reinforced strips 6 and 12 of the walls 4 and 5 to slide one upon another until the expanded position shown in Fig. 6 is reached. The adjacent surfaces of the walls 4 and 5 may be coated with a lubricant, such as powdered soapstone, in order to prevent their adhesion. When the strips 6 and 12 reach the position shown in Fig. 6, they form with the strips 9 and 11 and the rim portion of the wall 3 the entire inflation chamber for the pneumatic tire.

The fabric reinforced strips 6 and 12 are of such arcuate length in cross section as to permit a substantial lap of these strips in the region of the crown portion or road engaging surface of the tire. In this manner, a protection is formed for each sidewall of the tire and an additional protection is provided at the crown portion of the tire, the region where punctures more frequently occur. If, due to a failure in the tube wall 3, the chamber 1 displaces the chamber 2, substantial reduction of the pressure in chamber 1 will result. However, such reduced pressure will still provide adequate support for the vehicle and prevent complete collapse of the tire.

Upon continued operation of a vehicle on which my multiple chamber tube is employed and after failure of the outer wall 3, the under-inflation of the tire soon becomes apparent to the operator, thus giving him adequate time to bring the vehicle to a stop or to continue to a more convenient location for repairing the tire. As there is no direct communication between chambers 1 and 2, the tire, after failure of the outer wall 3, may be driven for a considerable time before the cause of failure of the outer wall 3, if it continues to persist, affects the inner walls 4 and 5.

From the foregoing it is believed obvious that I have provided a safety type inner tube which reduces the hazards of high speed driving, and which is convenient of application and adapted for use with conventional tire assemblies.

While I have shown and described a preferred embodiment of my invention, it is to be understood that it may be otherwise embodied within the scope of the appended claims.

Having thus described my invention, what I claim and desire to protect by Letters Patent is:

1. A multi-chamber inner tube structure comprising an outer endless tubular wall, a separating partition formed therein for dividing the inner tube into an inner chamber and an outer chamber, and a valve mechanism for inflating these chambers, said partition being constituted as a composite structure including an inner wall and an outer wall each composed of a fabric reinforced strip and a resilient strip joined together along mutually contiguous margins, and the respective margins of said outer partition wall being circumferentially vulcanized, each to the adjacent portion of the wall of the inner tube, locally, at opposite sides of the rim region thereof, said inner and outer walls of the partition being disposed in opposed arrangement relatively to each other such that the reinforced strip of the inner partition wall is adjacent to and overlies the resilient strip of the outer partition wall at an edge of the latter, being vulcanized locally thereto at each side of the tube structure, the reinforced strips normally overlapping each other freely throughout an area of material extent, and acting, upon expansion of the inner chamber, resulting from deflation of the outer chamber, to slide relatively in opposite directions to an extended overlapped position adjacent to the crown portion of the inner tube, thereby serving to form, with the inner tube, a reinforced triple wall section at said region.

2. A multi-chamber inner tube structure comprising an outer endless tubular wall, a separating partition formed therein for dividing the inner tube into an inner chamber and an outer chamber, and valve mechanism for inflating these chambers, said partition being constituted as a composite structure including an inner wall and an outer wall each composed of a fabric reinforced strip and a resilient strip joined together along mutually contiguous margins, and the respective margins of said outer partition wall being circumferentially vulcanized, each to the adjacent portion of the wall of the inner tube, locally, at opposite sides of the rim region thereof, said inner and outer walls of the partition being disposed in opposed arrangement relatively to each other such that the reinforced strip of the inner partition wall is adjacent to and overlies the resilient strip of the outer partition wall at an edge of the latter, being vulcanized locally thereto at each side of the tube structure, the reinforced strips normally overlapping each other freely throughout an area of material extent, and acting, upon expansion of the inner chamber, resulting from deflation of the outer chamber, to slide relatively in opposite directions to an extended overlapped position adjacent to the crown portion of the inner tube, thereby serving to form, with the inner tube, a reinforced triple wall section at said region.

3. An inflation chamber having an annular exterior wall and a partition therein extending from side to side of said exterior wall, said partition including an inner wall and an outer wall, each consisting of an elastic strip and an impervious fabric strip, said strips being joined together along mutually contiguous margins, the outer margins of said inner and outer walls being secured together and anchored to the opposite sides of said exterior wall, portions of the fabric strips normally overlapping each other and being freely slidable upon each other, upon application of pressure to the partition toward the crown of the exterior wall.

4. A partition for an inflation chamber of a tire comprising an inner wall and an outer wall each consisting of an impervious elastic strip and an impervious fabric strip joined together along mutually contiguous margins, the outer edge portion of each elastic margin of each wall being secured in a relatively fixed position to the end of the fabric strip of the adjacent wall so that the elastic strips overlap portions of the adjacent fabric strips and the fabric strips overlap each other and are slidable relatively to each other in opposite directions at substantially the central portion of the partition which is normally the crown portion.

ERNST EGER.